US012362829B2

United States Patent
Carugati et al.

(10) Patent No.: US 12,362,829 B2
(45) Date of Patent: Jul. 15, 2025

(54) MULTIMODE POWER CONTROL SCHEME FOR OPTICAL MODULE

(71) Applicant: Cisco Technology, Inc., San Jose, CA (US)

(72) Inventors: Antonio Carugati, Lissone MB (IT); Jerrold M. Pianin, Peoria, AZ (US); Theodor Kupfer, Feucht (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 232 days.

(21) Appl. No.: 17/989,999

(22) Filed: Nov. 18, 2022

(65) Prior Publication Data

US 2024/0171279 A1     May 23, 2024

(51) Int. Cl.
*H04B 10/80*     (2013.01)
*H04B 10/2581*     (2013.01)
*H04B 10/564*     (2013.01)

(52) U.S. Cl.
CPC ....... *H04B 10/2581* (2013.01); *H04B 10/564* (2013.01); *H04B 10/808* (2013.01)

(58) Field of Classification Search
None
See application file for complete search history.

(56) References Cited

U.S. PATENT DOCUMENTS

| | | | | |
|---|---|---|---|---|
| 6,674,274 B2 * | 1/2004 | Hobrecht | ............ | H02M 3/1584 323/284 |
| 2004/0008996 A1 * | 1/2004 | Aronson | ............ | H04B 10/0799 398/202 |
| 2009/0162051 A1 * | 6/2009 | Hudgins | ................ | H04B 10/40 398/139 |
| 2009/0196624 A1 * | 8/2009 | Zhang | .................... | H04B 10/40 398/135 |
| 2012/0011286 A1 * | 1/2012 | Wong | ..................... | H04B 10/40 710/14 |
| 2012/0091815 A1 * | 4/2012 | Richards, III | .......... | H02M 1/32 307/80 |

(Continued)

OTHER PUBLICATIONS

Radhakrishnan Nagarajan, et al., "Low Power DSP-Based Transceivers for Data Center Optical Fiber Communications (Invited Tutorial)," Journal of Lightwave Technology, vol. 39, No. 16, Aug. 15, 2021, 11 pages.

*Primary Examiner* — Li Liu
(74) *Attorney, Agent, or Firm* — Edell, Shapiro & Finnan, LLC (57) ABSTRACT

A method is performed by a host assembly including a controller, a power supply circuit, and a host connector to be connected to an optical module of a particular type among different types of optical modules respectively configured to accept different types of supply voltages. The method includes: when the optical module is connected to the host assembly, identifying a particular type of supply voltage, among the different types of the supply voltages, that the optical module is configured to accept; selecting, among different power modes available to the host assembly that are respectively compatible with the different types of the supply voltages, a particular power mode that is compatible with the particular type of the supply voltage; and operating in the particular power mode to provide the particular type of the supply voltage to the optical module.

20 Claims, 7 Drawing Sheets

(56) References Cited

U.S. PATENT DOCUMENTS

| | | | |
|---|---|---|---|
| 2012/0230700 A1* | 9/2012 | Cafiero | G02B 6/4201 |
| | | | 398/138 |
| 2014/0185637 A1* | 7/2014 | Louderback | H01S 5/06804 |
| | | | 315/297 |
| 2015/0127957 A1* | 5/2015 | Sethi | G06F 1/26 |
| | | | 713/300 |
| 2016/0134081 A1 | 5/2016 | Louderback | |
| 2016/0226217 A1* | 8/2016 | Jia | H04B 10/503 |
| 2016/0282892 A1* | 9/2016 | Saavedra | G06F 1/263 |
| 2016/0286480 A1* | 9/2016 | Shen | H04W 52/0206 |
| 2018/0267257 A1* | 9/2018 | Aboulhouda | H01S 5/042 |
| 2019/0326993 A1* | 10/2019 | Zheng | H04B 10/40 |
| 2020/0145107 A1* | 5/2020 | Tittenhofer | H04B 10/40 |
| 2020/0328677 A1* | 10/2020 | Amin | H02M 3/1582 |
| 2021/0028861 A1 | 1/2021 | Featherston et al. | |
| 2021/0232196 A1* | 7/2021 | Sultenfuss | H02J 7/02 |
| 2022/0149943 A1* | 5/2022 | Seki | H04B 10/07955 |
| 2022/0390996 A1* | 12/2022 | Sultenfuss | H02J 7/00034 |
| 2023/0388019 A1* | 11/2023 | Li | H04B 10/501 |
| 2024/0126358 A1* | 4/2024 | Lin | H02J 7/0068 |

\* cited by examiner

MULTIMODE POWER CONTROL SCHEME FOR OPTICAL MODULE

TECHNICAL FIELD

The present disclosure relates generally to network device host power control for pluggable optical modules.

BACKGROUND

A network device, such as a router or switch, may include a host assembly (also referred to as a "host side" or simply a "host" of the network device) and an optical module that plugs into the host and communicates over an optical fiber. The host provides a supply voltage to the "pluggable" optical module to power the optical module. The optical module may consume a large amount of power, especially when the optical module is configured for high bandwidth communications. The optical module typically employs many power converters, e.g., direct current (DC)-to-DC (DC-DC) converters, which step down the supply voltage provided by the host to lower voltages used to power internal components of the optical module. The power conversion can be inefficient and thus wastes power. The host also include additional DC-DC converters to convert a high voltage on the host input to the supply voltage, which adds to the power inefficiency. The host provides the supply voltage and a corresponding supply current to the optical module through power leads, network power filters, and connectors that mate the host to the optical module. The aforementioned components gives rise to further power loss in the form of ohmic/resistive loss, i.e., power distribution loss. The combined power conversion and distribution losses can be substantial.

From the perspective of the host, operating to maximize power efficiency (and minimize power loss) is complicated by the fact that the optical module may be one of many different types or models of optical modules. The different types of optical modules accept/use correspondingly different types of supply voltages. For example, the optical module may be a legacy optical module that accepts only a fixed supply voltage, or the optical module may be a newer optical module that can accept a range of supply voltages, or can accept a fixed supply voltage that is substantially higher than the legacy supply voltage.

DETAILED DESCRIPTION

Overview

In an embodiment, a method is performed by a host assembly including a controller, a power supply circuit, and a host connector to be connected to an optical module of a particular type among different types of optical modules respectively configured to accept different types of supply voltages. The method includes: when the optical module is connected to the host assembly, identifying a particular type of supply voltage, among the different types of the supply voltages, that the optical module is configured to accept; selecting, among different power modes available to the host assembly and that are respectively compatible with the different types of the supply voltages, a particular power mode that is compatible with the particular type of the supply voltage; and operating in the particular power mode to provide the particular type of the supply voltage to the optical module.

Example Embodiments

Embodiments presented herein include a multimode power control architecture in which a host assembly (also referred to as a "host") of a network device selectively operates in any one of several different (i.e., multiple) power modes to provide compatible power to different types of optical modules that can be plugged into the host and that are configured to accept different types of power supply voltages to power the optical modules. More specifically, the host operates in selected ones of different power modes to provide corresponding ones of the different types of power supply voltages (referred to simply as "supply voltages") to the different types of optical modules. By way of example, the different types of supply voltages may include (i) a first fixed supply voltage (e.g., a "legacy" supply voltage of 3.3 Volts (V)) for backward compatibility, (ii) a variable supply voltage that can vary over a voltage range (e.g., 3.0-5.0 V), which can be leveraged to optimize/maximize a power efficiency of the optical module, and (iii) a second fixed supply voltage (e.g., 12 V) that is greater than the first fixed supply voltage, and which minimizes ohmic loss or drop (i.e., current (I) resistance (R) (IR)) in distributing the supply voltage from the host to the optical module through a connector, and which also avoids conversion loss on the host that would otherwise arise from step-down conversion of the second fixed supply voltage to the legacy supply voltage.

Different types of optical modules handle/accept different types of supply voltage used to operate the optical modules. For example, one type of optical module may accept only the legacy supply voltage (e.g., 3.3 V), the variable supply voltage (e.g., 3-5 V), or the second fixed supply voltage (e.g., 12 V). Another type of optical module may accept both the legacy supply voltage and the variable supply voltage, and so on. Therefore, the multimode power control architecture accommodates or supports all of the different types of optical modules by providing the different types of supply voltages accepted by the different types of optical modules. The multimode power architecture advantageously:

a. Decreases the supply current from the host to the optical module across power network filters, connector pins, and mating contacts. This means the IR drop due to serial parasitic resistances is reduced quadratically.
b. Reduces power circuit complexity on the host when the second fixed voltage (e.g., 12 V) is provided directly from the host to the optical module without voltage step-down conversion on the host.
c. Employs a preferred or optimized supply voltage of the variable supply voltage to optimize DC-DC converter efficiency in the optical module.
d. Avoids redundant voltage conversions on the host to improve power saving (due to less DC-DC conversion loss), and reduces the number of power components.
e. Offers backward compatibility of the host from newer types of optical modules to the legacy optical.
f. Allows a more efficient thermal profile of the host and optical module due to an overall decrease of the power consumption. It also allows for less complexity and less power consumption in any associated cooling system.

Figure 1:
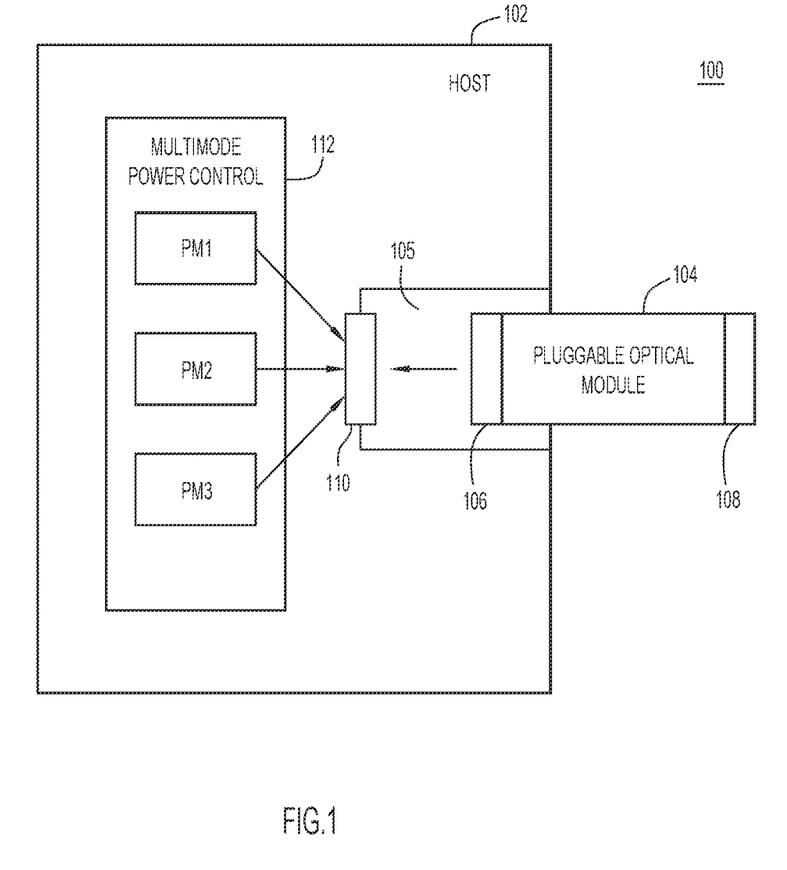
FIG. 1 is a block diagram of a network device in which multimode power control over an optical module may be performed, according to an example embodiment.

With reference to FIG. 1, there is a block diagram of an example network device 100 in which embodiments directed to multimode power control of an optical module may be performed. Network device 100 may be a switch or router employed to forward data packet across a network, for example. Network device 100 includes a host 102 and an optical module 104 configured to be removably coupled/connected to the host. For example, optical module 104 may be plugged into and unplugged from host 102 and is therefore also referred to as a "pluggable" optical module. Host 102 may be configured as a host circuit board, a line card in a network device chassis or rack, or the like. In the example of FIG. 1, host 102 includes a receptacle 105 to receive optical module 104. Optical module 104 includes an electrical connector 106 and an optical connector 108 at opposing ends of the optical module. When optical module 104 is plugged into receptacle 105, electrical connector 106 of the optical module plugs into or mates with a host connector 110 of host 102. At the opposite, exposed end of optical module 104, optical connector 108 is mated to an optical fiber connector for an optical link (not shown). FIG. 1 shows a single instance of multimode power control 112 and optical module 104, by way of example only. It is understood that a network device may include many such instances.

Optical module 104 may include an optical transmitter to transmit one or more optical signals over an optical fiber and/or an optical receiver to receive one or more optical signals over an optical fiber. The optical signals may or may not be wavelength division multiplexing (WDM) optical signals (including super-dense (SD) WDM (SDWDM) optical signals). Examples of different types of (pluggable) optical modules include, but are not limited to, quad small form-factor pluggable (QSFP) optical modules, QSFP-double density (DD) (QSFP-DD) optical modules, octal small formfactor pluggable (OSPF) optical modules, and different models of each of the foregoing optical modules. Such optical modules may support 100-800 Gbps data rates, for example. As mentioned above, different types of optical modules often accept correspondingly different types of supply voltages employed to power-on and operate the optical modules.

Figure 3:
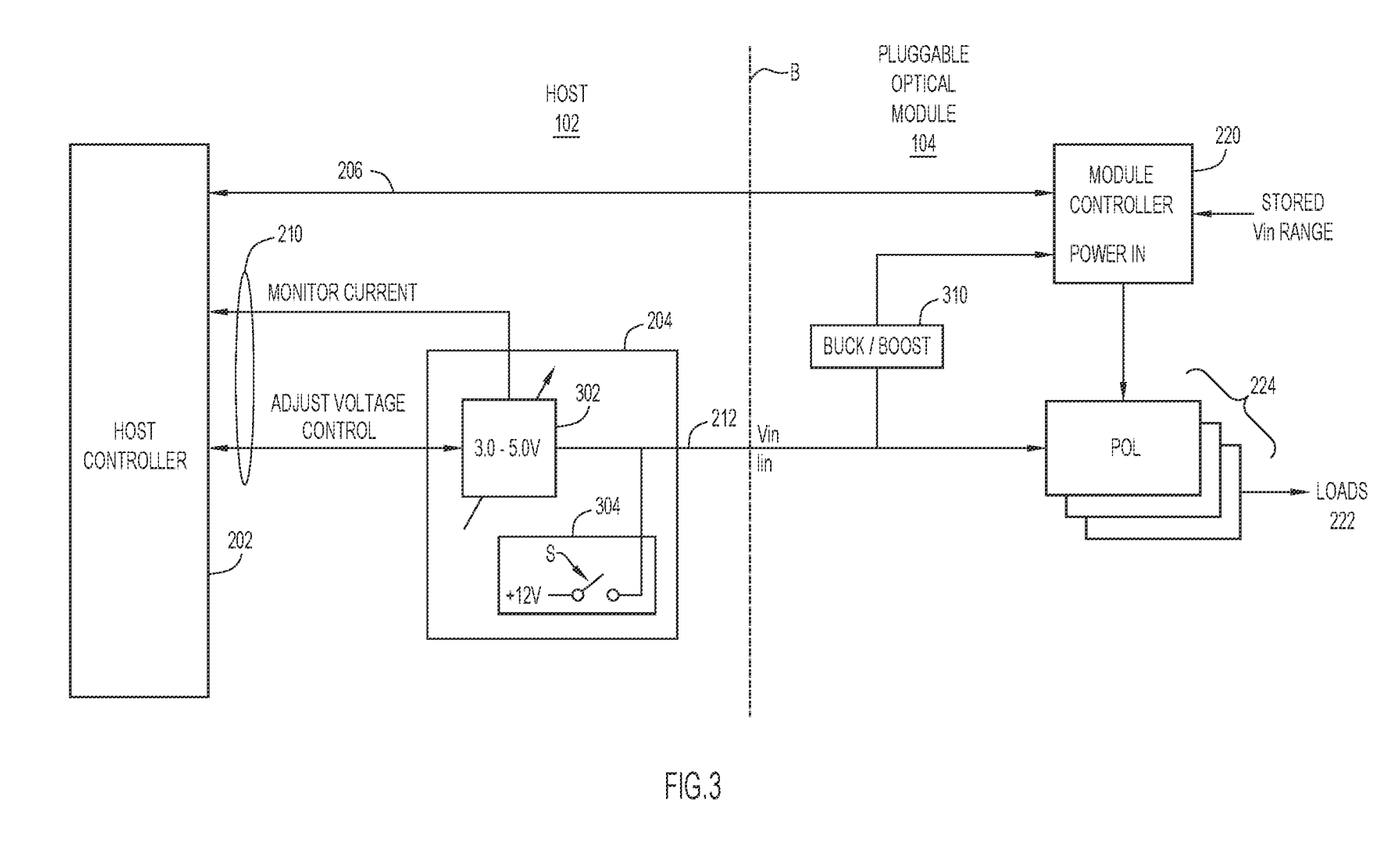
FIG. 3 is an illustration of the host and the optical module that is useful for describing multiple power modes of the host that provide different types of supply voltages to the optical module, depending on a type of the optical module, according to an example embodiment.

To this end, host 102 implements multimode power control 112 to selectively operate in any one of different power modes PM1, PM2, and PM3 to provide corresponding ones of the different types of supply voltages to the different types of optical modules when plugged into host 102. Although three power modes are shown in FIG. 3, it is understood that multimode power control 112 may provide more or less power modes to accommodate more or less types of supply voltages. When optical module 104 is plugged into and thus electrically connected to host 102 through host connector 110 and electrical connector 106 (collectively referred to as the "connectors"), the host communicates with, and provides a selectable supply voltage to, optical module 104 through the connectors. Specifically, host 102 (i) determines which type of supply voltage that optical module 104 accepts (e.g., the first fixed/legacy supply voltage, the variable supply voltage (i.e., a range of voltages), or the second fixed supply voltage), and (ii) operates in a compatible power mode (e.g., PM1, PM2, or PM3) to provide that type of supply voltage to the optical module.

Figure 2:
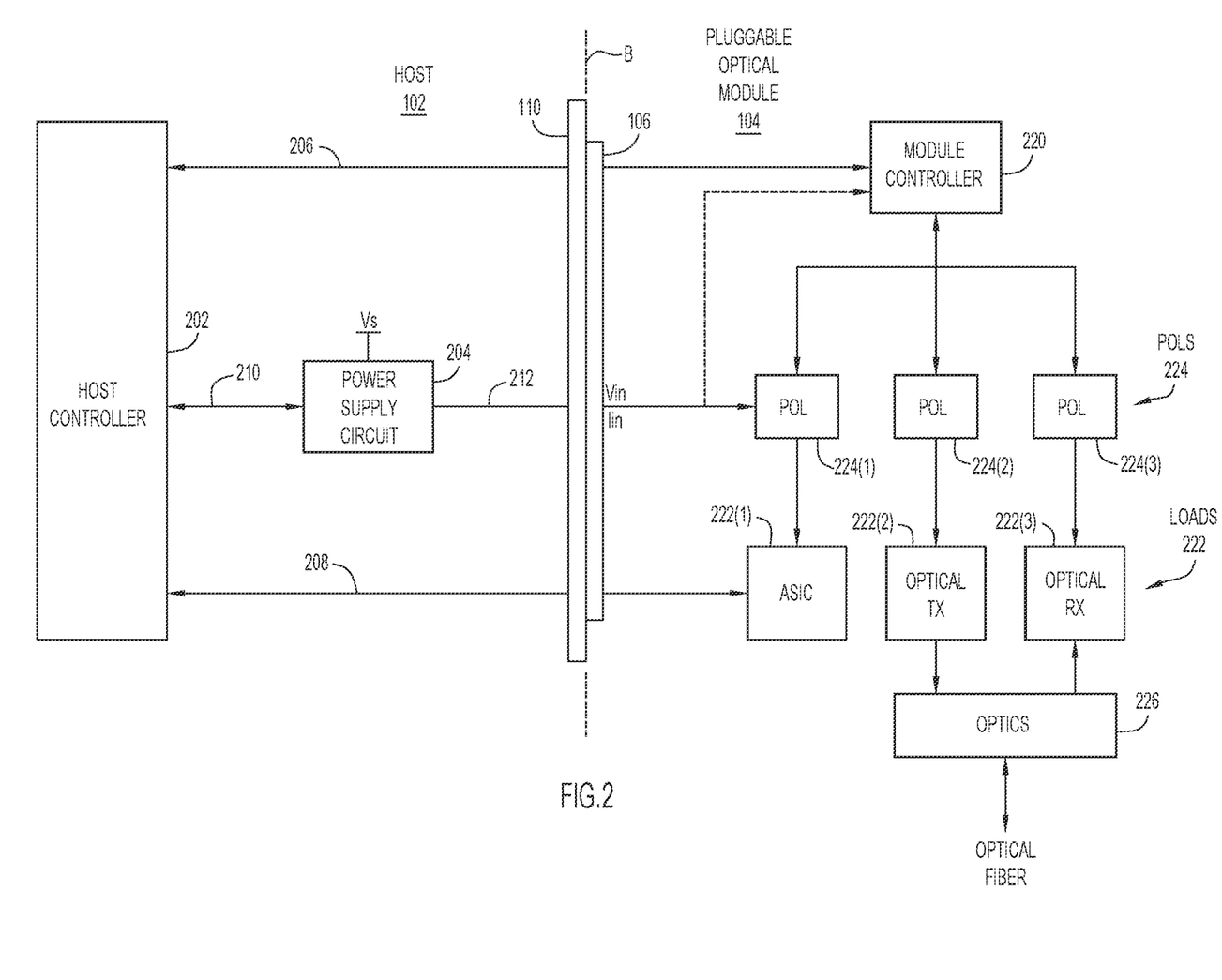
FIG. 2 is a block diagram that shows further details of a host and the optical module of the network device, according to an example embodiment.

FIG. 2 is a block diagram that shows further details of host 102 and optical module 104 when plugged into the host. Host 102 includes host controller 202 and a power supply circuit 204 coupled to each other and to host connector 110. A vertical dashed line B represents a host-to-optical module interface (FF) formed by host connector 110 and electrical connector 106, when mated together. Together, host controller 202 and power supply circuit 204 implement multimode power control 112. Host controller 202 communicates with optical module 104 over a control bus 206 (e.g., an inter-integrated circuit FC bus) and a data bus 208 that carry/exchange control information and electrical receive/transmit high-speed data, respectively. Host controller 202 communicates with power supply circuit 204 over a control bus 210. For example, host controller 202 sends a supply voltage control command (e.g., a digital command) to power supply circuit 204. In response to the supply voltage control command, power supply circuit 204 generates a supply voltage Vin from a host supply voltage Vs, and provides supply voltage Vin to optical module 104 over a power bus 212 and through the host-to-optical module FF. Power supply circuit 204 may employ any known or hereafter developed power circuit, including voltage regulators, DC-DC converters, and the like, to generate supply voltage Vin responsive to supply voltage control commands. Host controller 202 can command power supply circuit 204 to generate any supply voltage Vin over a voltage range, such as 1 V to 12 V, for example. Power supply circuit 204 may be calibrated such that a given supply voltage control command results in a known supply voltage Vin.

Power supply circuit 204 may also include a voltage sensor that measures supply voltage Vin and communicates the measured supply voltage (i.e., the supply voltage measurement) to host controller 202 via control bus 210. Power supply circuit 204 may also include a current sensor that (i) measures a supply current Iin (also referred to as a "load current Iin") provided to optical module 104 over power bus 212, and (ii) provides the measured current to host controller 202 over control bus 210. In this way, host controller 202 can monitor a power Pin that power supply circuit 204 provides to optical module 104, where Pin=Iin·Vin.

Optical module 104 includes (i) a module controller 220 to control the optical module, (ii) powered circuits or loads 222 that include an application specific integrated circuit (ASIC) 222(1) (e.g., a gate array), an optical transmitter (TX) 222(2), and an optical receiver (RX) 222(3), (iii) point-of-loads (POLs) 224 that include POL 224(1), POL 224(2), and POL 224(3) to supply power to respective ones of the loads, and (iv) optics 226 to couple the optical TX and optical RX to an optical fiber. ASIC 221(1) exchanges the electrical receive/transmit high-speed data with host 102. In a transmit direction, optical TX 222(2) converts the electrical transmit data from host 102 to an optical signal and transmits the same over the optical fiber coupled to optical module 104. In a receive direction, optical RX 222(3) receives an optical signal from the optical fiber and converts the same to the electrical receive data to be provided to host 102. Module controller 220 is coupled to loads 222 and POLs 224. Optical module 104 may include additional loads and corresponding POLs.

Module controller 220 may receive supply voltage Vin directly as a supply voltage for the module controller. Alternatively, module controller 220 may receive a conditioned or regulated version of supply voltage Vin as the supply voltage (see, e.g., FIG. 3). POLs 224 may include regulators or DC-DC converters configured to receive supply voltage Vin from host 102 as a primary voltage, convert the primary voltage to regulated or converted secondary voltages (e.g., contained within optical module 104), and provide the secondary voltages (and corresponding secondary supply current) to corresponding ones of loads 222. Power conversion efficiencies of POLs 224 vary as a function of supply voltage Vin, supply current tin, and the secondary supply current provided by the POLs to their respective loads 222 (i.e., the supply current sunk by each of loads 222). Environmental factors, such as temperature, may also affect the power conversion efficiencies.

Module controller 220 communicates with (i.e., exchanges data with) host controller 202 over control bus 206. For example, host controller 202 communicates with module controller 220 to determine which type(s) of supply voltage(s) optical module 104 accepts. To this end, module controller 220 includes local memory that stores data indicative of the acceptable supply voltage or supply voltage range for optical module 104, and may advertise the acceptable supply voltage to host controller 202 over control bus 206.

With reference to FIG. 3, there is an illustration of host 102 and optical module 104 useful for describing operation of host 102 in the different power modes (e.g., PM1, PM2, and PM3) to provide different types of supply voltages to the optical module 104. For simplicity, some of the components of optical module 104 are omitted from FIG. 3. Also, FIG. 3 shows various supply voltages by way of example, only; other supply voltages may be used.

In the example of FIG. 3, power supply circuit 204 includes a power block 302 to provide a variable supply voltage Vin over a voltage range of 3.0-5.0 V to power bus 212, under control of host controller 202. Additionally, power block 302 may disconnect the variable supply voltage Vin from power bus 212 under control of host controller 202. Power block 302 may provide a variable supply voltage of 3.0-5.0 V to power bus 212, or a fixed supply voltage of 3.3 V to the power bus, for example. Power block 302 may include step-down DC-DC converters to generate the supply voltage from higher host supply voltage Vs (shown in FIG. 2). Power supply circuit 204 further includes a power block 304 to provide a fixed voltage Vin=12 V to power bus 212, under control of host controller 202. Power block 304 includes, for example, a switch S that may be opened or closed under control of host controller 202 to disconnect Vin=12 V from power bus 212 or connect Vin=12 V to the power bus, respectively. Power block 304 provides Vin=12 V directly from host supply voltage Vs, without performing DC-DC conversion, which advantageously reduces DC-DC conversion loss and increases power efficiency. Although shown separately for clarity, power block 302 and power block 304 may be combined into a single power block. In the example of FIG. 3, module controller 220 is powered by 3.3 V. Because Vin may be different from 3.3 V depending on the power mode implemented by host 102, optical module 104 further includes a buck/boost converter 310 to regulate Vin always to 3.3 V, and to provide the 3.3 V to module controller 220.

Generally, optical module 104 may be any one of several different types of optical modules (sometimes referred to below simply as "modules") configured to accept or support (i.e., operate off of) different types of supply voltages. For example, the different types of modules may include:

a. A first type of optical module configured to accept only a first fixed supply voltage, e.g., a legacy module configured to accept only a fixed legacy supply voltage Vin=3.3 V.

b. A second type of optical module configured to accept a variable supply voltage, e.g., a voltage range of 3.0-5.0 V, which includes the fixed legacy supply voltage.

c. A third type of optical module configured to accept only a second fixed supply voltage, e.g., 12 V, which is greater than the first fixed voltage and voltages in the voltage range.

Once optical module 104 is plugged into host 102, the optical module and the host perform the following operations. Initially, host controller 202 commands power block 302 to provide to optical module 104 the first fixed supply voltage, e.g., the legacy supply voltage Vin=3.3 V. This may be considered a default supply voltage. The default supply voltage powers-on module controller 220, which can then support communications with host controller 202 over control bus 206.

Next, host controller 202 communicates with module controller 220 to identify/determine a particular type of supply voltage, among the possible types of supply voltages, that optical module 104 can actually accept. For example, host controller 202 queries module controller 220 for its acceptable supply voltage range (i.e., for the type of supply voltage accepted by optical module 104), and the module controller responds with information defining the acceptable supply voltage range. Next, host controller 202 selects, among different power modes in which the host can operate (e.g., PM1, PM2, and PM3) and that are respectively compatible with the different types of supply voltages (e.g., the first fixed supply voltage, the variable supply voltage, and the second fixed supply voltage), a particular power mode that is compatible with the particular type of supply voltage. The following power mode selections may be made:

a. When the particular type of supply voltage is the first fixed supply voltage, e.g., legacy supply voltage Vin=3.3 V, host controller 202 selects a first power mode (e.g., PM1) configured to provide the first fixed supply voltage, e.g., Vin=3.3 V. In the first power mode, for example, host controller 202 commands power block 302 to generate fixed Vin=3.3 V.

b. When the particular type of supply voltage is the variable supply voltage, host controller 202 selects a second power mode (e.g., PM2) configured to provide the variable supply voltage in a manner that maximizes the power efficiency of optical module 104. Operation in the second power mode is described below.

c. When the particular type of supply voltage is the second fixed supply voltage, e.g., supply voltage Vin=12 V, host controller 202 selects a third power mode (e.g., PM3) configured to provide the second fixed supply voltage, e.g., Vin=12 V. In the third power mode, for example, host controller 202 commands power block

304 to generate Vin=12 V, which maximizes power distribution efficiency by reducing ohmic losses across the host-to-optical module boundary, and by omitting DC-DC voltage step-down conversion on host 102 in order to increase overall power efficiency.

Generally, power efficiency is a ratio of input power to output power (i.e., power delivered to a load). Operating at an optimum/maximum power efficiency occurs when there is a minimum power loss due to DC-DC voltage conversion and power distribution loss. A power efficiency of 100% means there is no power loss, such that all input power is delivered to the load and converted to output power, while a 90% power efficiency means there is a 10% power loss, and so on.

Host 102 operates in the selected first, second, or third power mode to provide the particular type of supply voltage to optical module 104, while maximizing power efficiency. While operating in the first and second power modes, power block 302 may employ one or more DC-DC converters to perform voltage step-down conversion to the supply voltage Vin. On the other hand, while operating in the third power mode, power block 304 provides the supply voltage Vin without performing additional DC-DC conversion (i.e., power block 304 does not perform DC-DC conversion).

When host 102 operates in the second power mode, host 102 determines, within the supply voltage range that is acceptable to optical module 104, a preferred supply voltage Vin that maximizes the power efficiency of the optical module, and then provides the preferred supply voltage Vin to the optical module. Host 102 may use multiple methods to determine the preferred supply voltage Vin. A first method includes varying supply voltage Vin provided to optical module 104 across the supply voltage range, monitoring/computing the power consumed by the optical module for the varying supply voltage, and selecting, as the preferred supply voltage, the supply voltage at which the optical module consumes the minimum power as computed—and thus operates at the maximum power efficiency. The first method may include the following operations:

a. Host controller 202 commands power block 302 to step the supply voltage Vin across multiple voltages (i.e., to produce voltage steps) in the supply voltage range, e.g., starting with the lowest voltage.

b. At each voltage step, power block 302 measures supply current tin sunk by optical module 104 corresponding to the supply voltage Vin, and provides the measured current to host controller 202. Host controller 202 computes power Pin consumed by optical module 104, where Pin=Vin tin. This produces multiple values of power Pin corresponding to multiple values of supply voltage Vin stepped across the voltage range.

c. Host controller 202 selects, as the preferred supply voltage Vin, a voltage among the multiple voltage values (i.e., the voltage steps) that produced the minimum power Pin, and commands power block 302 to provide the preferred supply voltage.

Figure 4:
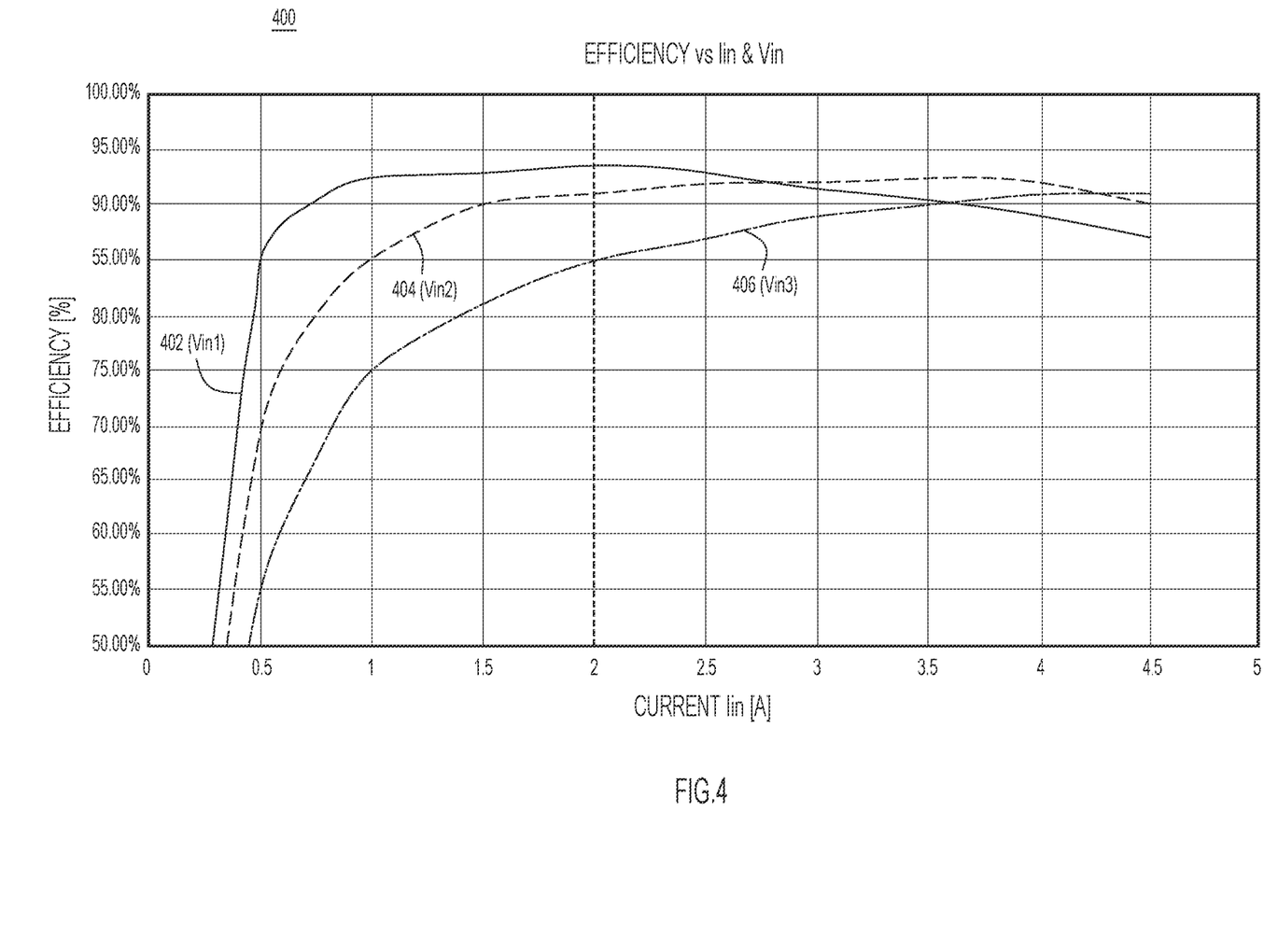
FIG. 4 shows predetermined curves of power efficiency of the optical module vs. supply current for various supply voltages provided to the optical module, according to an example embodiment.

A second method relies on predetermined power efficiency data described in connection with FIG. 4. FIG. 4 shows example predetermined plots or curves 400 of power efficiency of optical module 104 vs. supply current tin for various supply voltages Vin provided to the optical module. The curves 400 include a curve 402 for Vin=Vin1, a curve 404 for Vin=Vin2, and a curve 406 for Vin=Vin3. The number of curves may be increased for an increased number of values of supply voltage Vin.

Referring to FIGS. 3 and 4, the second method includes the following operations:

a. An a priori operation includes storing or configuring memory of host 102 with curves 400. Alternatively, curves 400 may be stored in the memory of optical module 104. Either way, host 102 can access curves 400.

b. Host controller 202 commands power block 302 to provide to optical module 104 a level of voltage Vin that is within the voltage range. This may be the default supply voltage. Power block 302 measures supply current tin, and reports the measured current to host controller 202.

c. Host controller 202 accesses curves 400, and identifies a particular curve among the curves that yields a highest/maximum power efficiency of the optical module at the measured current. Host controller 202 commands power block 302 to provide the supply voltage corresponding to the identified curve as the preferred supply voltage Vin. Referring to FIG. 4, for example, when the measured supply current is 2 A, curve 402 has the highest or maximum power efficiency among curves 400. Thus, host controller 202 sets supply voltage Vin=Vin1 corresponding to curve 402.

Another embodiment further optimizes the supply voltage provided to the optical module based on temperature or any other environmental variable. A method employed to optimize the supply voltage based on the environmental variable is similar to the second method described above, except that host controller 202 performs periodic polling of the optical module for an optimum supply voltage to be used based on the environmental variable (which may be defined by an environmental variable vs. supply voltage curve stored in the optical module, for example), and corrects the supply voltage based on results of the polling.

Figure 5:
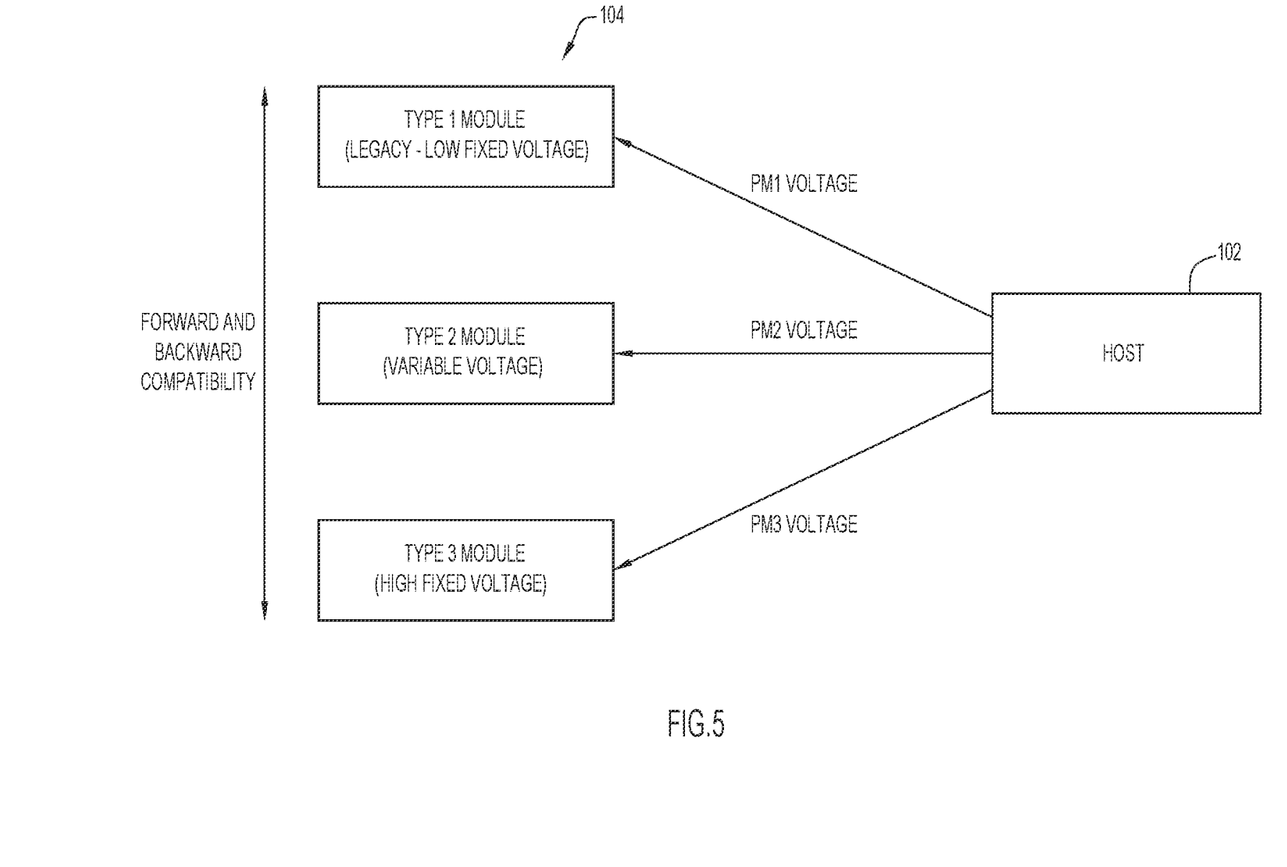
FIG. 5 is an illustration of forward and backward compatibility between different types of optical modules that is supported by the multiple power modes of the host, according to an example embodiment.

FIG. 5 is an illustration of forward and backward compatibility between different types of optical modules and host 102. When a type1 or legacy optical module is plugged into host 102, the host operates in power mode PM1 to provide to the legacy optical module the legacy fixed supply voltage (e.g., 3.3 V). When a type2 optical module, which accepts the variable supply voltage, is plugged into host 102, the host operates in power mode PM2 to provide to the optical module a preferred supply voltage (in the voltage range) to maximize the power efficiency (and minimize power loss) of the optical module. When a type3 optical module, which accepts the high fixed supply voltage, is plugged into host 102, the host operates in power mode PM3 to provide to the optical module the fixed high supply voltage to the optical module to minimize power loss.

Figure 6:
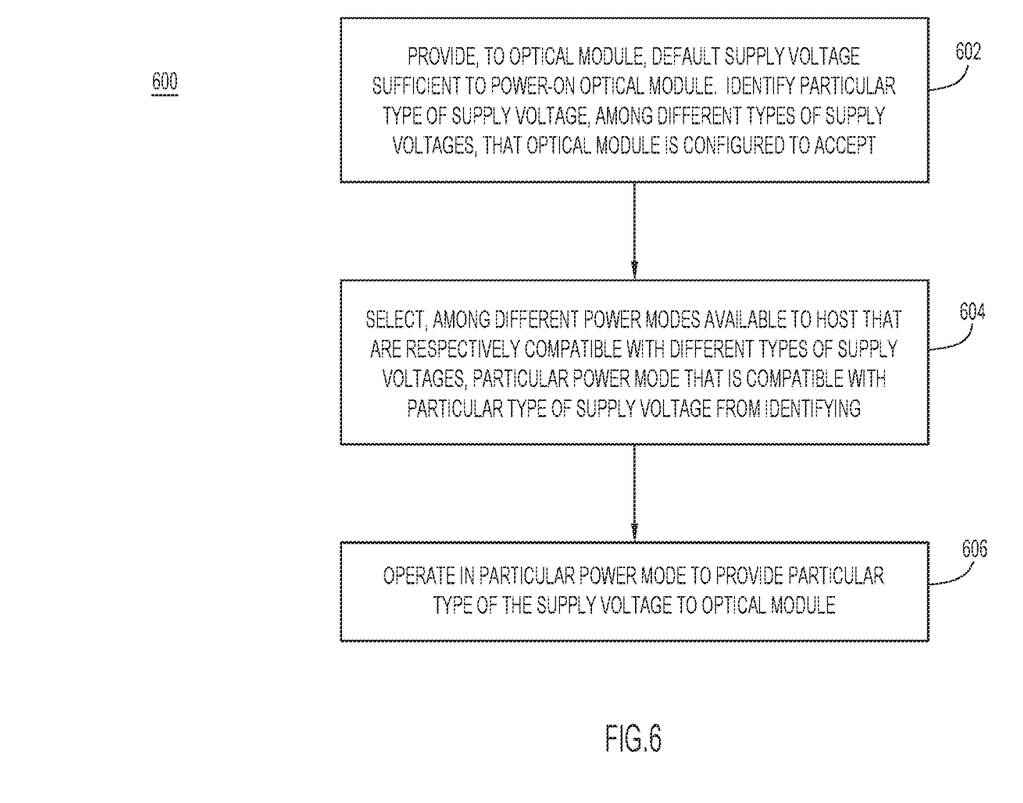
FIG. 6 is a flowchart of a method of multimode power control of a pluggable module plugged into the host, performed by the host, according to an example embodiment.

FIG. 6 is a flowchart of an example method 600 of multimode power control performed by host 102 that includes host controller 202, power supply circuit 204, and host connector 110 configured to be connected to (e.g., plugged into) optical module 104. Optical module 104 may be configured as a particular type of optical module among many different/possible types of optical modules respectively configured to accept different types of supply voltages. Support for operations of method 600 is described above.

When optical module 104 is connected/plugged into host 102, at 602, initially, the host provides, to optical module 104, a default supply voltage sufficient to power-on (optical) module controller 220 to enable the host to communicate with the module controller. Then, host 102 identifies/determines a particular type of supply voltage, among the different types of the supply voltages, that the optical module of the particular type is configured to accept. To do this, host 102 queries optical module 104 for an indication of the supply voltages supported by the optical module, and the optical module responds with the indication. Host 102 may identify the particular supply voltage as a first fixed supply voltage, a voltage range/variable supply voltage that encompasses the first fixed voltage, or a second fixed supply voltage that is greater than the other types of supply voltages, for example.

At 604, host 102 selects, among different power modes available to the host (i.e., multiple possible power modes in which the host can operate) that are respectively compatible with the different types of the supply voltages, a particular power mode that is compatible with the particular type of the supply voltage. For example, host 102 selects one of power modes PM1, PM2, or PM3 corresponding to the first fixed supply voltage, the variable supply voltage, and the second fixed supply voltage, respectively.

At 606, host 102 operates in the particular power mode to provide the particular type of the supply voltage to the optical module.

Additional embodiments focus on the number of electrical power pins in host connectors 110 and electrical connector 106. In one embodiment, a reduced number of pins, e.g., 1 or 2 pins, are used when the legacy supply voltage (e.g., 3.3 V) is provided to the optical module. On the other hand, more pins are added to the 1 or 2 pins when a higher supply voltage is provided. Another embodiment would adjust the supply voltage based on supply current In monitored by host 102.

In summary, a multimode power control architecture for powering optical modules of different types is presented. The multimode power control architecture supports an optical module that can accept a fixed legacy supply voltage of 3.3 V for backward compatibility, and also either (i) a variable supply voltage in a voltage range over which power efficiency can be optimized, or (ii) a direct fixed high voltage of 12V used to limit IR-drop, which decreases power consumption on the optical module and on a host that provides the supply voltage by limiting the IR-drop and reducing DC-DC conversion. In another embodiment that skips the use of the fixed legacy supply voltage (e.g., fixed 3.3 V), only a variable supply voltage is used. In yet another embodiment, only a fixed high supply voltage (e.g., 12 V) is used.

Figure 7:
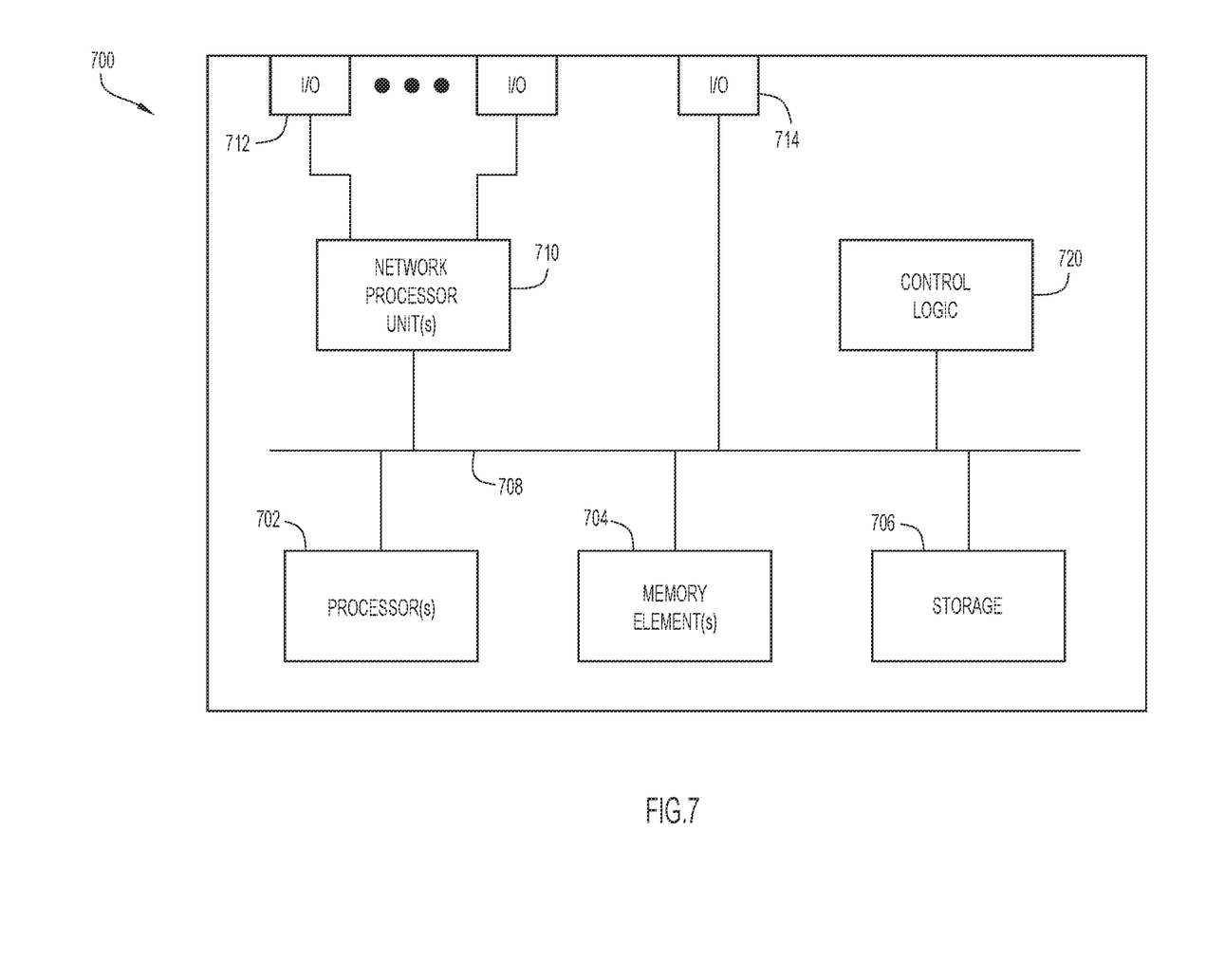
FIG. 7 illustrates a hardware block diagram of a computing device that may perform functions associated with operations discussed herein in connection with the techniques depicted in FIGS. 1-6, according to an example embodiment.

Referring to FIG. 7, FIG. 7 illustrates a hardware block diagram of a computing device 700 that may perform functions associated with operations discussed herein in connection with the techniques depicted in FIGS. 1-7. In various embodiments, a computing device or apparatus, such as computing device 700 or any combination of computing devices 700, may be configured as any entity/entities as discussed for the techniques depicted in connection with FIGS. 1-7 in order to perform operations of the various techniques discussed herein. Computing device 700 may represent network device 100, including host 102, and optical module 104.

In at least one embodiment, the computing device 700 may be any apparatus that may include one or more processor(s) 702, one or more memory element(s) 704, storage 706, a bus 708, one or more network processor unit(s) 710 interconnected with/coupled to one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RF ID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 8 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 8) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In some aspects, the techniques described herein relate to a method including: at a host assembly including a controller, a power supply circuit, and a host connector to be connected to an optical module of a particular type among different types of optical modules respectively configured to accept different types of supply voltages: when the optical module is connected to the host assembly, identifying a particular type of supply voltage, among the different types of the supply voltages, that the optical module is configured to accept; selecting, among different power modes available to the host assembly and that are respectively compatible with the different types of the supply voltages, a particular power mode that is compatible with the particular type of the supply voltage; and operating in the particular power mode to provide the particular type of the supply voltage to the optical module.

In some aspects, the techniques described herein relate to a method, wherein: when the particular type of the supply voltage is a first fixed supply voltage, selecting includes selecting a first power mode, and operating includes operating in the first power mode to provide the first fixed supply voltage to the optical module; and when the particular type of the supply voltage is a variable supply voltage, selecting includes selecting a second power mode, and operating includes operating in the second power mode to provide the variable supply voltage.

In some aspects, the techniques described herein relate to a method, wherein: when the particular type of the supply voltage is a second fixed supply voltage that is greater than the first fixed supply voltage, selecting includes selecting a third power mode, and operating includes operating in the third power mode to provide the second fixed supply voltage.

In some aspects, the techniques described herein relate to a method, wherein: operating in the first power mode includes performing a direct current (DC)-to-DC (DC-DC) power conversion to produce the first fixed supply voltage; and operating in the third power mode includes not performing a DC-DC power conversion to produce the second fixed supply voltage to increase power efficiency.

In some aspects, the techniques described herein relate to a method, wherein: when the particular type of the supply voltage is a variable supply voltage in a voltage range, selecting includes selecting a power mode compatible with the variable supply voltage, and operating in the power mode includes: determining, in the voltage range, a preferred supply voltage at which the optical module operates with a maximum power efficiency; and providing the preferred supply voltage to the optical module.

In some aspects, the techniques described herein relate to a method, wherein determining includes: storing curves of optical module power efficiency vs. supply current for corresponding curve supply voltages; measuring the supply current provided to the optical module; identifying a particular curve among the curves that yields a highest optical module power efficiency at the supply current; and selecting, as the preferred supply voltage, a curve supply voltage corresponding to the particular curve.

In some aspects, the techniques described herein relate to a method, wherein determining includes: stepping the supply voltage across the voltage range to produce voltage steps; measuring a supply current and computing a power that is consumed by the optical module at each of the voltage steps; and selecting, as the preferred supply voltage, a voltage among the voltage steps corresponding to a minimum power from computing.

In some aspects, the techniques described herein relate to a method, wherein identifying the particular type of the supply voltage includes: upon querying the optical module for a type of supply voltage accepted by the optical module, receiving, from the optical module, information indicative of the particular type of the supply voltage.

In some aspects, the techniques described herein relate to a method, further including: while identifying the particular type of the supply voltage, providing a default supply voltage to the optical module to power-on at least a controller of the optical module.

In some aspects, the techniques described herein relate to a method, wherein the optical module is one of a quad small form-factor pluggable (QSFP) optical module, a QSFP-double density (DD) (QSFP-DD) optical module, and an octal small formfactor pluggable (OSPF) optical module.

In some aspects, the techniques described herein relate to an apparatus including: a host assembly including a power supply circuit, a controller, and a connector to be connected to an optical module of a particular type among different types of optical modules respectively configured to accept different types of supply voltages, the host assembly configured to perform: when the optical module is connected to the host assembly, identifying a particular type of supply voltage, among the different types of the supply voltages, that the optical module is configured to accept; selecting, among different power modes available to the host assembly and that are respectively compatible with the different types of the supply voltages, a particular power mode that is compatible with the particular type of the supply voltage; and operating in the particular power mode to provide the particular type of the supply voltage to the optical module.

In some aspects, the techniques described herein relate to an apparatus, wherein: when the particular type of the supply voltage is a first fixed supply voltage, the host assembly is configured to perform selecting by selecting a first power mode, and operating by operating in the first power mode to provide the first fixed supply voltage to the optical module; and when the particular type of the supply voltage is a variable supply voltage, the host assembly is configured to perform selecting by selecting a second power mode, and operating by operating in the second power mode to provide the variable supply voltage.

In some aspects, the techniques described herein relate to an apparatus, wherein: when the particular type of the supply voltage is a second fixed supply voltage that is greater than the first fixed supply voltage, the host assembly is configured to perform selecting by selecting a third power mode, and operating by operating in the third power mode to provide the second fixed supply voltage.

In some aspects, the techniques described herein relate to an apparatus, wherein: the host assembly is configured to perform operating in the first power mode by performing a direct current (DC)-to-DC (DC-DC) power conversion to produce the first fixed supply voltage; and the host assembly is configured to perform operating in the third power mode by not performing a DC-DC power conversion to produce the second fixed supply voltage to increase power efficiency.

In some aspects, the techniques described herein relate to an apparatus, wherein: when the particular type of the supply voltage is a variable supply voltage in a voltage range, the host assembly is configured to perform: selecting by selecting a power mode compatible with the variable supply voltage; and operating in the power mode by: determining, in the voltage range, a preferred supply voltage at which the optical module operates with a maximum power efficiency; and providing the preferred supply voltage to the optical module.

In some aspects, the techniques described herein relate to an apparatus, wherein the host assembly is configured to perform determining by: storing curves of optical module power efficiency vs. supply current for corresponding curve supply voltages; measuring the supply current provided to the optical module; identifying a particular curve among the curves that yields a highest optical module power efficiency at the supply current; and selecting, as the preferred supply voltage, a curve supply voltage corresponding to the particular curve.

In some aspects, the techniques described herein relate to an apparatus, wherein the host assembly is configured to perform determining by: stepping the supply voltage across the voltage range to produce voltage steps; measuring a supply current and computing a power that is consumed by the optical module at each of the voltage steps; and selecting, as the preferred supply voltage, a voltage among the voltage steps corresponding to a minimum power from computing.

In some aspects, the techniques described herein relate to a system including: a host assembly including a power supply circuit, a controller, and a host connector connected to the power supply circuit and the controller; and an optical module of a particular type among different types of optical modules respectively configured to accept different types of supply voltages, the optical module configured to be plugged into the host connector, wherein the host assembly is configured to perform: when the optical module is plugged into the host assembly, identifying a particular type of supply voltage, among the different types of the supply voltages, that the optical module is configured to accept; selecting, among different power modes available to the host assembly and that are respectively compatible with the different types of the supply voltages, a particular power mode that is compatible with the particular type of the supply voltage; and operating in the particular power mode to provide the particular type of the supply voltage to the optical module.

In some aspects, the techniques described herein relate to a system, wherein: when the particular type of the supply voltage is a first fixed supply voltage, the host assembly is configured to perform selecting by selecting a first power mode, and operating by operating in the first power mode to provide the first fixed supply voltage to the optical module; and when the particular type of the supply voltage is a variable supply voltage, the host assembly is configured to perform selecting by selecting a second power mode, and operating by operating in the second power mode to provide the variable supply voltage.

In some aspects, the techniques described herein relate to a system, wherein the optical module is one of a quad small form-factor pluggable (QSFP) optical module, a QSFP-double density (DD) (QSFP-DD) optical module, and an octal small formfactor pluggable (OSPF) optical module.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a host assembly including a controller, a power supply circuit, and a host connector to be connected to an optical module of a particular type among different types of optical modules respectively configured to accept different types of supply voltages:
   when the optical module is connected to the host assembly, identifying a particular type of supply voltage, among the different types of the supply voltages, that the optical module is configured to accept;
   when the particular type of the supply voltage is a first fixed supply voltage, operating in a first power mode to provide the first fixed supply voltage to the optical module; and
   when the particular type of the supply voltage is a variable supply voltage in a voltage range, operating in a second power mode by:
      stepping the supply voltage across voltage steps of the voltage range;
      measuring a supply current and computing a power that is consumed by the optical module at each voltage step;
      selecting, as a preferred supply voltage, a voltage step corresponding to a minimum power from computing; and
      providing the preferred supply voltage to the optical module.

2. The method of claim 1, wherein:
   the first fixed supply voltage is in the voltage range.

3. The method of claim 1, wherein:
   when the particular type of the supply voltage is a second fixed supply voltage that is greater than the first fixed supply voltage, operating in a third power mode to provide the second fixed supply voltage.

4. The method of claim 3, wherein:
   operating in the first power mode includes performing a direct current (DC)-to-DC (DC-DC) power conversion to produce the first fixed supply voltage; and
   operating in the third power mode includes not performing a DC-DC power conversion to produce the second fixed supply voltage to increase power efficiency.

5. The method of claim 3, wherein:
   the voltage range is 3 to 5 volts and the second fixed supply voltage is 12 volts.

6. The method of claim 1, wherein
   the minimum power corresponds to a maximum power efficiency of the optical module.

7. The method of claim 1, wherein identifying the particular type of the supply voltage includes:
   upon querying the optical module for a type of the supply voltage accepted by the optical module, receiving, from the optical module, information indicative of the particular type of the supply voltage.

8. The method of claim 1, further comprising:
   while identifying the particular type of the supply voltage, providing a default supply voltage to the optical module to power-on at least a controller of the optical module.

9. The method of claim 1, wherein the optical module is one of a quad small form-factor pluggable (QSFP) optical module, a QSFP-double density (DD) (QSFP-DD) optical module, and an octal small formfactor pluggable (OSPF) optical module.

10. An apparatus comprising:
    a host assembly including a power supply circuit, a controller, and a connector to be connected to an optical module of a particular type among different types of optical modules respectively configured to accept different types of supply voltages, the host assembly configured to perform:
    when the optical module is connected to the host assembly, identifying a particular type of supply voltage, among the different types of the supply voltages, that the optical module is configured to accept;
    when the particular type of the supply voltage is a first fixed supply voltage, operating in a first power mode to provide the first fixed supply voltage to the optical module; and
    when the particular type of the supply voltage is a variable supply voltage in a voltage range, operating in a second power mode by:
       stepping the supply voltage across voltage steps of the voltage range;
       measuring a supply current and computing a power that is consumed by the optical module at each voltage step;
       selecting, as a preferred supply voltage, a voltage step corresponding to a minimum power from computing; and
       providing the preferred supply voltage to the optical module.

11. The apparatus of claim 10, wherein:
    the first fixed supply voltage is in the voltage range.

12. The apparatus of claim 10, wherein:
    when the particular type of the supply voltage is a second fixed supply voltage that is greater than the first fixed supply voltage, the host assembly is configured to perform operating in a third power mode to provide the second fixed supply voltage.

13. The apparatus of claim 12, wherein:
the host assembly is configured to perform operating in the first power mode by performing a direct current (DC)-to-DC (DC-DC) power conversion to produce the first fixed supply voltage; and
the host assembly is configured to perform operating in the third power mode by not performing a DC-DC power conversion to produce the second fixed supply voltage to increase power efficiency.

14. The apparatus of claim 12, wherein:
the voltage range is 3 to 5 volts and the second fixed supply voltage is 12 volts.

15. The apparatus of claim 10, wherein:
the minimum power corresponds to a maximum power efficiency of the optical module.

16. The apparatus of claim 10, wherein the host assembly is further configured to perform:
while identifying the particular type of the supply voltage, providing a default supply voltage to the optical module to power-on at least a controller of the optical module.

17. A system comprising:
a host assembly including a power supply circuit, a controller, and a host connector connected to the power supply circuit and the controller; and
an optical module of a particular type among different types of optical modules respectively configured to accept different types of supply voltages, the optical module configured to be plugged into the host connector,
wherein the host assembly is configured to perform:
when the optical module is plugged into the host assembly, identifying a particular type of supply voltage, among the different types of the supply voltages, that the optical module is configured to accept;
when the particular type of the supply voltage is a first fixed supply voltage, operating in a first power mode to provide the first fixed supply voltage to the optical module; and
when the particular type of the supply voltage is a variable supply voltage in a voltage range, operating in a second power mode by:
stepping the supply voltage across voltage steps of the voltage range;
measuring a supply current and computing a power that is consumed by the optical module at each voltage step;
selecting, as a preferred supply voltage, a voltage step corresponding to a minimum power from computing; and
providing the preferred supply voltage to the optical module.

18. The system of claim 17, wherein:
the first fixed supply voltage is in the voltage range.

19. The system of claim 17, wherein the optical module is one of a quad small form-factor pluggable (QSFP) optical module, a QSFP-double density (DD) (QSFP-DD) optical module, and an octal small formfactor pluggable (OSPF) optical module.

20. The system of claim 17, wherein the host assembly is further configured to perform:
while identifying the particular type of the supply voltage, providing a default supply voltage to the optical module to power-on at least a controller of the optical module.

* * * * *